United States Patent

Shallenberger et al.

[11] 3,914,613
[45] Oct. 21, 1975

[54] INSPECTION AND REPAIR APPARATUS FOR A NUCLEAR REACTOR FUEL ASSEMBLY

[75] Inventors: John M. Shallenberger, Pittsburgh; Leonard P. Hornak, Irwin; Walter E. Desmarchais, Monroeville, all of Pa.

[73] Assignee: Westinghouse Electric Corporation, Pittsburgh, Pa.

[22] Filed: Feb. 6, 1974

[21] Appl. No.: 440,104

[52] U.S. Cl.................................. 250/515; 176/28
[51] Int. Cl............................................... G21f 7/02
[58] Field of Search........... 250/514, 515, 517, 518; 176/27, 28

[56] References Cited
UNITED STATES PATENTS

| | | |
|---|---|---|
| 3,113,915 | 12/1963 | Webb et al. ..................... 250/515 X |
| 3,756,915 | 9/1973 | Matveevich et al. ........... 250/515 X |

*Primary Examiner*—James W. Lawrence
*Assistant Examiner*—Davis L. Willis
*Attorney, Agent, or Firm*—D. C. Abeles

[57] ABSTRACT

Apparatus is disclosed for inspecting and repairing a radioactive fuel assembly. The radioactive fuel assembly is positioned within a shielding sleeve which substantially reduces the level of radioactivity immediately surrounding the sleeve thereby permitting direct access by operating personnel. In one embodiment, a rotatable collar is mounted to the sleeve at a mid-length location. An access port, an inspection port and an instrument port are included with the collar so that operating personnel may directly inspect the fuel assembly and effectuate any necessary repairs.

8 Claims, 4 Drawing Figures

3,914,613

INSPECTION AND REPAIR APPARATUS FOR A NUCLEAR REACTOR FUEL ASSEMBLY

CROSS-REFERENCE TO RELATED APPLICATIONS

This application is related to our copending patent application having the Ser. No. 440,105 filed Feb. 6, 1974 which is filed concurrently herewith and entitled "Handling Apparatus For A Nuclear Reactor Fuel Assembly."

BACKGROUND OF THE INVENTION

1. Field of the Invention

This invention pertains to nuclear reactor fuel assemblies and more particularly to an arrangement for inspecting and repairing a radioactive fuel assembly.

2. Description of the Prior Art

In today's commercial nuclear power plants, there exists a requirement to replace the nuclear core at predetermined time intervals, usually on the order of once every year. This involves removal of radiated fuel assemblies from the core which is located within a reactor vessel; and, after an appropriate period of storage in a spent fuel pit, transferring the fuel assemblies from the storage pit into a shipping cask. Usually the shipping cask is designed to function additionally as a radiation shield, thus the cask may be handled directly by personnel without the need for specialized radiation protection equipment. After the irradiated fuel assembly is placed within the shipping cask, it is sealed and loaded onto a truck or rail car and shipped off the nuclear reactor site. It is to be noted, that throughout these transfer operations, the irradiated fuel assembly is shielded at all times. The operations whereby the fuel assembly is removed from the core and transferred into the shipping cask are performed under water, the water serving as a radiation shield; thereafter, the shipping cask itself serves to shield the radioactive fuel assembly.

In the prior art, replacement of the spent fuel assemblies by new fuel assemblies did not usually require the above-mentioned radiation protection procedures. This was because new fuel assemblies such as those utilized in boiling water reactors or pressurized water reactors contain enriched uranium oxide which is not radioactive. Therefore, in the prior art, new fuel elements were brought onto the reactor site by truck or rail, were removed therefrom by a crane and then transferred to a new fuel storage pit without being shielded during these operations.

With the increasing availability of fissile plutonium 239, which is produced as a by-product within water moderated nuclear reactors, and the inherent economic advantages offered by the use of this nuclear fuel, it is readily understandable why certain new fuel assemblies include significant amounts of recycled fissile plutonium. However, since this material is highly radioactive in its "natural state," the prior art handling techniques for a new fuel assembly are no longer satisfactory. That is, that all handling operations such as transferring, inspecting, viewing, and effectuating minor repairs at the reactor site must be performed with the fuel assembly being adequately shielded to prevent operating personnel from being exposed to highly dangerous radioactivity.

SUMMARY OF THE INVENTION

The aforementioned inadequacy of the prior art is overcome by the present invention which provides apparatus for viewing, inspecting and repairing a new but radioactive fuel assembly by operating personnel under direct yet shielded conditions.

The invention provides a shielding sleeve having means for effectuating inspection and repair operations integrally associated therewith. In a preferred embodiment, the shielding sleeve comprises an inner sleeve and an outer sleeve with an annulus between the sleeves filled with radiation shielding material such as water or mineral oil. The length of the shielding sleeve is slightly greater than double the length of a fuel assembly so that the total length of the assembly may be inspected and repaired while maintaining the radiation shield.

The shielding sleeve reduces the level of radiation immediately surrounding the exterior of the shielding sleeve to a level low enough to permit direct access by personnel. The inspection and repair means are provided by a rotatable collar mounted at the sleeve's midlength. The collar also consists of an inner and an outer sleeve having shielding material in the annulus between the sleeves. However, this sleeve includes an inspection port, an access port and an instrument port.

Each port is designed to either eliminate or minimize radiation exposure to personnel inspecting or repairing the fuel assembly. For example, the inspection port includes a removable leaded glass window which is filled with mineral oil. In another example, the access port is equipped with a removable plug which completely shields the port when it is not being used. To make a necessary repair, the plug is removed thereby permitting the operator direct access to the fuel assembly. Upon completion of the repair, the plug is replaced. In still another example, a borescope is inserted within the instrument port which is positioned tangential to the opening within the shielding sleeve. In this manner, no direct path exists for radiation streaming through the port.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Figure 1:
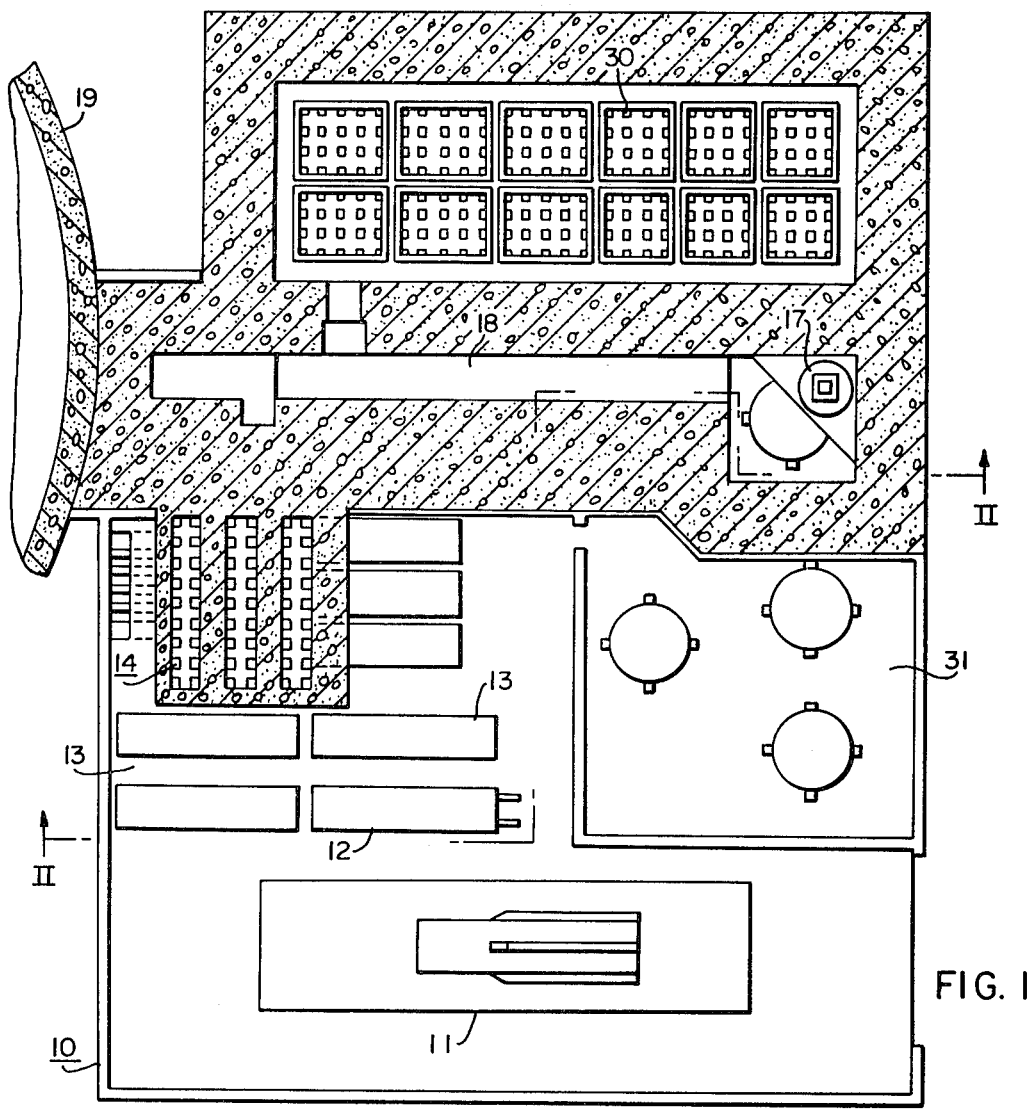
FIG. 1 is a floor plan of a fuel handling building of a nuclear reactor power plant wherein the apparatus as provided by this invention may be utilized.

Throughout the description which follows, like reference characters indicate like elements in the various figures of the drawing.

Figure 2:
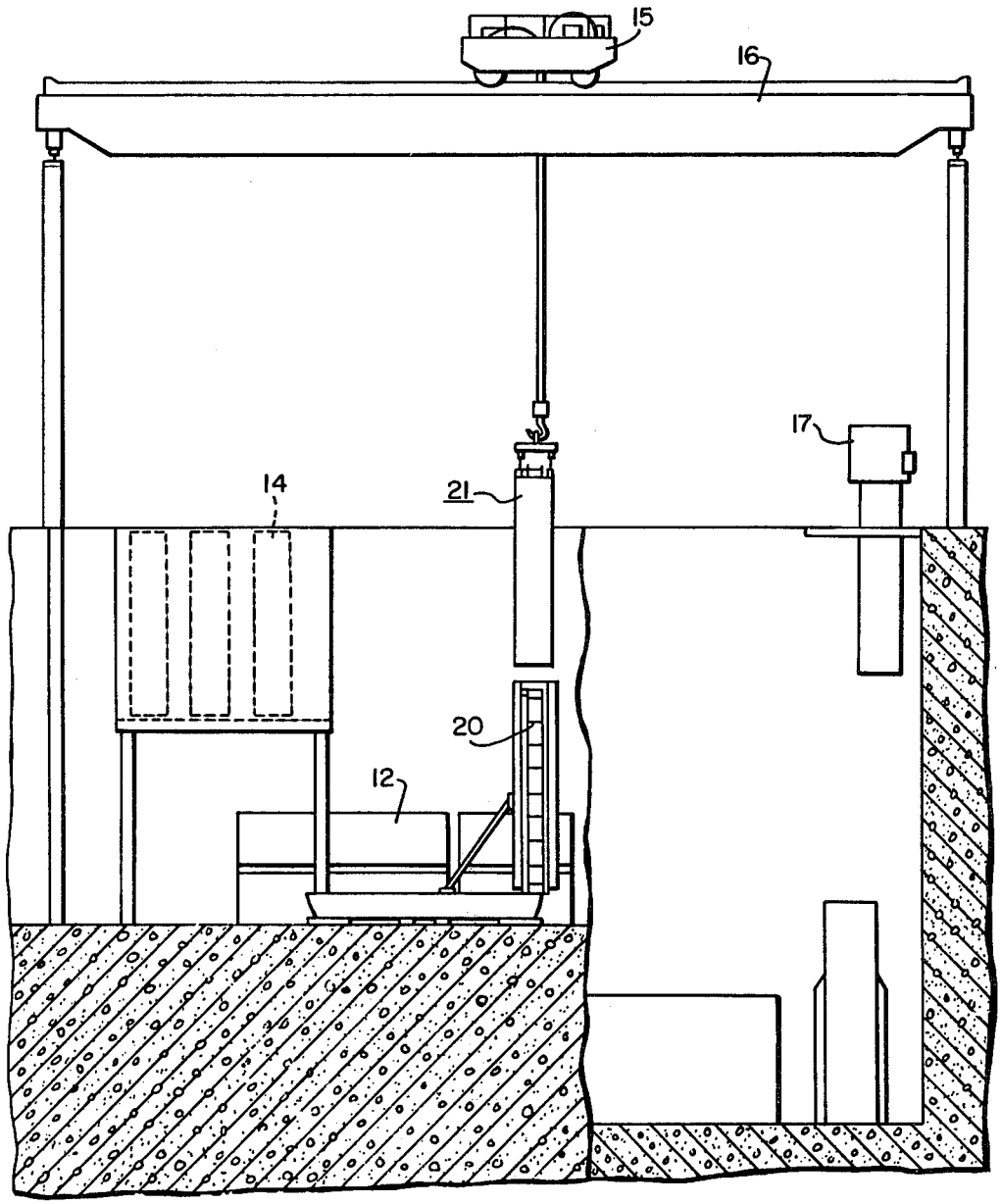
FIG. 2 is a sectional view of the building of FIG. 1 taken substantially along the line II—II.

The building arrangement depicted in FIGS. 1 and 2 is intended to be typical of the many possible building arrangements which allow for fuel transfer operations at a reactor site. These fuel transfer operations fall within two broad categories. The first category consists of transferring new fuel assemblies from rail cars or trucks to onsite storage areas located within a fuel handling building. The second broad category consists of transferring used or spent fuel assemblies from a spent fuel storage area onto a truck or rail car for shipment off-site. Although this specification will be primarily concerned with the treatment accorded new fuel assemblies during the former category or the transfer of new fuel assemblies, the invention is not to be thereby limited. Modifications of the apparatus provided herein will be readily apparent to one skilled in the art in the utilization of this invention for the inspection and repair of used radioactive fuel assemblies.

New plutonium recycle fuel assemblies which are highly radioactive, may be brought into a fuel handling building 10 be either rail or truck. Unloading of the vehicle is accomplished at an unloading area 11. Typically, new fuel assemblies will be contained within shipping containers which provide for radiation shielding during transit. The shipping containers 12 are removed from the transport vehicle by an overhead crane 15 which is suitably supported on a track or rail 16 forming an integral part of the fuel handling building 10. The shipping containers are then placed in an area 13 adapted for storage of the shipping containers 12.

To remove a new fuel assembly 20 from a shipping container, the fuel assembly 20 is up-ended along with a portion of the shipping container in a manner as shown in FIG. 2. Although not essential, it is preferable that the up-ended portion of the shipping container provides for radioactive shielding during this phase of the transfer operation. The fuel assembly 20 is then drawn up within a shielded fuel handling arrangement 21, such as that disclosed in our copending patent application Ser. No. 440,105 filed Feb. 6, 1974 and filed concurrently herewith, which is suspended from overhead crane 15 and moved to a new fuel storage area 14. New fuel storage area 14 may be made from concrete and filled with water to provide adequate shielding. It is to be observed, that up to this point all the fuel handling and transfer operations are accomplished dry, that is, not under water. However, radiation shielding is continuously provided to permit the presence of a reactor site operating personnel.

Still referring to FIGS. 1 and 2, the new plutonium recycle fuel is then transferred from the new fuel storage area 14 to an inspection station and repair 17 and then to a refueling canal 18 in preparation for reloading a core of a nuclear reactor (not shown) located in a reactor containment building 19. During transfer of the fuel from the new fuel storage area 14 to the refueling canal 18 radiation shielding is provided by the fuel handling arrangement 21. While the new fuel is located at the inspection station 17, radiation shielding is provided by a combination of the fuel handling arrangement 21 and a fuel inspection and repair arrangement 25. As with the prior transfer operations within the fuel handling building 10, these are also accomplished dry which permits direct access by reactor site personnel without the danger of radioactive exposure. As shown in FIG. 1, a spent fuel storage area 30 is operatively connected to the refueling canal 18. Also, a spent fuel shipping cask storage area 31 is located adjacent the unloading area 11. These and a cask loading area 32 are located in close proximity to inspection station 17. Therefore, the fuel inspection and repair arrangement 25 which is provided by this invention may be readily adaptable for the inspection and repair of spent fuel which is also highly radioactive.

Figure 4:
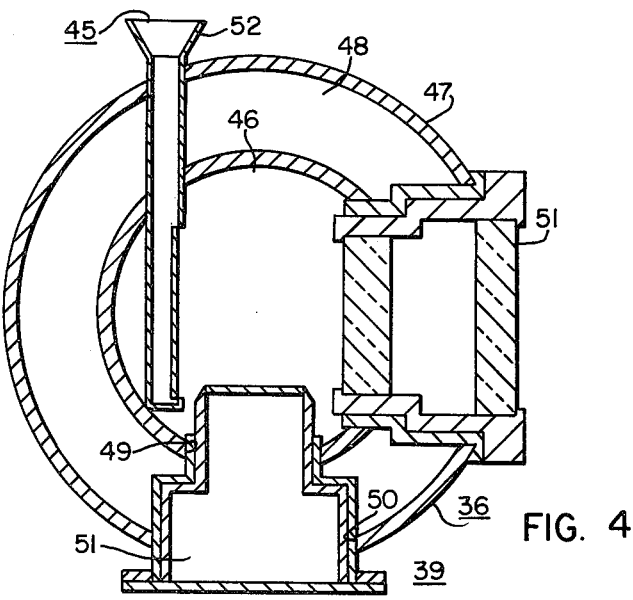
FIG. 4 is a cross-sectional view of the rotating collar of FIG. 3 taken substantially along line IV—IV.
Figure 3:
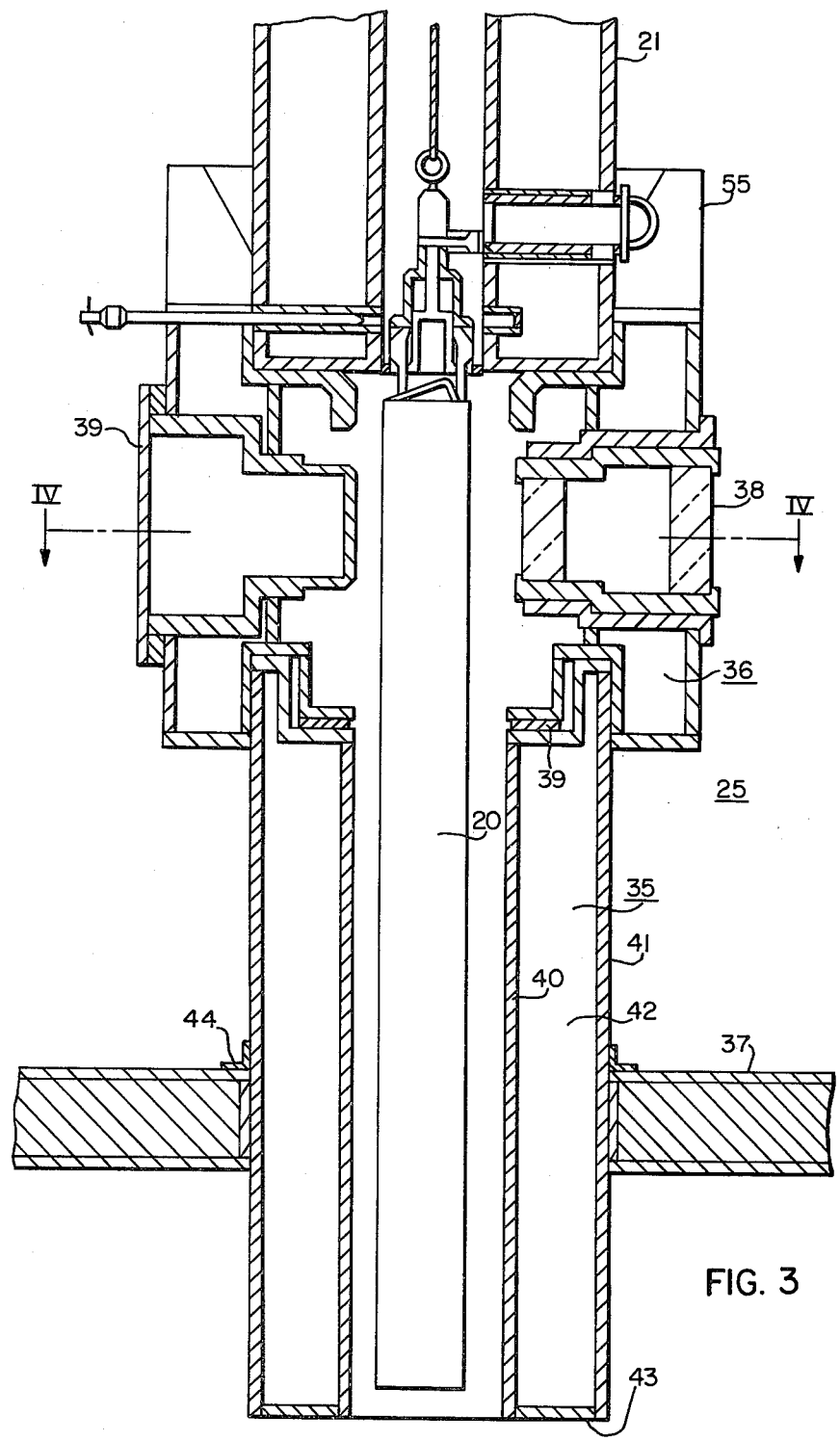
FIG. 3 is one form of a radiation shield and rotatable collar as provided by this invention.

Details of one form of the arrangement 25 for the inspection and repair of new plutonium recycle fuel assemblies is shown in FIGS. 3 and 4. Referring now to FIG. 3, it is seen that the arrangement 25 basically comprises two main sub-sections, a shielding sleeve 35 and a rotating collar 36. Sleeve 35 extends through floor 37 and in the example shown has a length approximately equal to the maximum size of a fuel assembly which will be utilized with the arrangement 25. Rotating collar 36 is mounted on bearings 39 on top of radiation sleeve 35. An inspection port 38 and an access port 39 may be seen in rotating collar 36. The height of these ports above floor level is substantially on line with shoulder level of operating personnel standing on floor 37. Since certain fuel assemblies for nuclear reactor power plants are 12 feet or more in length, it is to be observed that radiation sleeve 35 extends a greater distance below floor level 37 than above floor level.

In order to completely shield operating personnel during fuel assembly inspection or repairs, a portion of rotating collar 36 must extend sufficiently upward so that the entire fuel assembly is shielded when the lowermost portion of the fuel assembly is on line with the viewing and access ports. This may be accomplished quite simply by attaching another radiation sleeve (not shown) similar to radiation sleeve 35, on top of rotating collar 36. Or, a more versatile arrangement may be employed such as that shown in FIG. 3. Radiation shielding above rotating collar 36 is provided by the fuel handling arrangement 21 as described in our previously referenced copending patent application "Inspection and Repair Arrangement For A Nuclear Reactor Fuel Assembly." Generally, fuel handling arrangement 21 comprises a radiation sleeve approximately equal to the length of a fuel assembly and fuel assembly grasping and lifting apparatus which is operatively associated with the sleeve. Thus, by mounting either a shielded sleeve or fuel handling arrangement 21 on top of rotating collar 36, an arrangement is provided whereby the entire length of a fuel assembly may be inspected and repaired by reactor site personnel while said personnel are substantially shielded from harmful radioactivity. Further, the rotating collar 36 permits viewing and access to all sides of the fuel assembly. It is to be noted that where a shielded sleeve is used, an overhead crane and a fuel handling tool or other like grasping and lifting means must be employed in order to vary the location of the fuel assembly within the arrangement 25.

Shielding sleeve 35 comprises an inner sleeve 40 and an outer sleeve 41 separated by an annulus 42. Each end of annulus 42 is appropriately capped by end plates 43. The upper end of sleeve 35 is shaped in a manner approximating a counter-bore which is adapted to accept a similarly shaped end of rotating collar 36 thereby providing radial restraint to rotating collar 36. Brackets 44 which are fixedly connected to outer sleeve 41 provide a method of securing, such as by bolting, radiation sleeve 35 to floor 37. Annulus 42 is filled with shielding material such as water, mineral oil, polyethylene or other like radiation shielding material. A preferred size of annulus 24 is such that it comprises a radiation shield equivalent to 6 inches of water. In a preferred embodiment, sleeves 41 and 40 are made from one inch stainless steel plate. The combination of one inch thick sleeves and a six inch shielding annulus will reduce the radiation level from 400 mr/hr. within the interior of radiation sleeve 35 to a level of approximately 2.5 mr/hr. at the outside of sleeve 35. The higher radiation level represents the maximum recycle radiation level of plutonium 239 which is the material from which the plutonium recycle fuel assemblies are made. The 2.5 mr/hr. radiation level represents an acceptable lower limit permitting direct access by reactor site personnel without harm from radiation.

As with the length of radiation sleeve 35, the width of inner sleeve 40 is consistent with the maximum width of a fuel assembly to be handled by the arrangement. For example, assuming a fuel assembly has a length of 160 inches, then the length of shielding sleeve 35 should be approximately 180 inches; and assuming a fuel assembly has a width of 8.5 inches, then the width of inner sleeve 40 should be approximately 12 inches.

In FIG. 4, it is seen that rotating collar 36 is provided with three ports, an inspection port 38, an access port 39 and an instrument port 45. The invention however is not to be limited to three such ports. Any number of ports may be utilized provided proper consideration is given to the radiation protection required and the teachings as provided herein are followed. Also, the number of levels of ports in the rotating collar 36 is not necessarily limited to one. Any number of levels of ports may be utilized as are deemed advantageous.

Rotating collar 36 includes an inner member 46, an outer member 47 and an annular member 48. Again, inner and outer members 46 and 47, respectively, may be fabricated from one inch stainless steel plate; annular member 48 may be made from an appropriate radiation shielding material having an equivalent thickness of 6 inches of water.

Access port 39 allows reactor site personnel to reach through rotating collar 36 and physically contact the fuel assembly contained therein to effectuate minor repairs. To facilitate this function, an opening 50 in outer member 47 is larger than an opening 49 in inner member 46; both inner 49 and outer 50 openings being made as large as practical. When not in use, access port 39 is sealed by a plug 51 to prevent radiation streaming through the opening. Plug 51 comprises a stainless steel jacket filled with radiation shielding material.

Inspection port 38 allows for direct viewing of a fuel assembly to be inspected. This port is fitted with a window which provides shielding yet is relatively transparent. Window 51 may be fabricated in a manner similar to conventional windows used in hot cells, for example, inner and outer panes of leaded glass may be arranged to have a space therebetween and the space being filled with mineral oil. An added degree of flexibility is achieved by providing window 51 with the capability of being removable from rotating collar 36. In normal operation, however, a fuel assembly is inspected by viewing through inspection port 38 with the inspection window 51 in place. In this manner, reactor site personnel receive a minimum dosage of radiation as compared to direct viewing which should be used only when necessary. The size of inspection port 38 is to be made also as large as practical consistent with the dimensions of rotating collar 36.

Instrument port 45 is complementary to inspection port 38. An instrument such as a borescope 52 may be fitted to instrument port 45 in a manner as shown in FIG. 4. Since borescopes generally include their own light source, lighted viewing of a fuel assembly is possible. Instrument port 45 also permits, in conjunction with inspection port 38, simultaneous viewing of a front and back side of a fuel assembly. Magnified viewing of particular suspect locations of a fuel assembly is possible with instrument port 45 provided a proper instrument is fitted thereto. Tangential or right angle viewing of a fuel assembly through the instrument port 45 effectively eliminates any danger of radiation to inspecting personnel. The size and shape of viewing port 45 is to be made consistent with the instrument to be used therewith. A plug (not shown) may also be used with instrument port 45 when the instrument is removed.

If the fuel inspection and repair arrangement is to be utilized in conjunction with a fuel handling arrangement 21, (FIG. 3), the use of a guide block 55 would be advantageous. Guide block 55 comprises a cylindrical member having major dimensions substantially equal to those of rotating collar 36. Guide block 55 is fixedly attached to the top of rotating collar 36. A portion of the length of an opening through guide block 55 is tapered to guide the entrance of fuel handling arrangement 21 during fit-up with the inspection and repair arrangement 25.

In accordance with the above, an inspection and repair arrangement is disclosed which provides a means for the direct inspection and minor repairing of a radioactive fuel assembly, such as, a plutonium recycle fuel assembly, without the danger of operating personnel receiving excessive amounts of highly dangerous radioactivity.

Since numerous changes may be made in the above described arrangement and different embodiments of the invention may be made without departing from the spirit and scope thereof, it is intended that all the matter contained in the foregoing description or shown in the accompanying drawings, shall be interpreted as illustrative and not in a limiting sense.

We claim:

1. Apparatus for inspecting and repairing an elongated radioactive fuel assembly comprising tubular shielding means for shielding said fuel assembly, said fuel assembly being positioned within said shielding means during said inspecting and repairing operations, viewing means for inspecting all sides of said fuel assembly, said viewing means being rotatably mounted on said shielding means, and access means for exposing all sides of said fuel assembly, to permit repairs thereof said access means being mounted rotatably on said shielding means.

2. The apparatus of claim 1, including means for grasping a fuel assembly and longitudinally positioning said fuel assembly to a predetermined location with respect to said access and said viewing means, said grasping and said positioning means being operatively associated with said shielding means.

3. The apparatus of claim 1, wherein said viewing and access means are positioned substantially at mid-length of said shielding means and said access and viewing means are positioned above the level of a floor a distance substantially equal to man's shoulder level.

4. The apparatus of claim 1, wherein said shielding means comprises an inner substantially cylindrical member, an outer substantially cylindrical member and an annulus between said inner and outer members, said annulus containing a material having radiation shielding characteristics, said shielding means having a length substantially equal to twice the length of said fuel assembly being inspected and repaired.

5. The apparatus of claim 1, wherein said viewing means for inspecting the fuel assembly comprises a substantially cylindrical member having an opening through a wall thereof, said cylindrical member being rotatably mounted on said shielding means.

6. The apparatus of claim 5, including a window positioned within said inspection opening, said window comprising a optically transparent radiation shield.

7. The apparatus of claim 5, wherein said viewing means for inspecting said fuel assembly includes an optical instrument positioned within said opening, said instrument having integral lighting means associated therewith, and said opening is tangential to the wall of said substantially cylindrical member.

8. The arrangement of claim 1, wherein said access means comprises an opening in a substantially cylindrical member having an opening through a wall thereof, said cylindrical member being attached to said shielding means for rotational movement thereon, and a plug for sealing said opening when said access means is not in use, said plug being a radiation shield.

* * * * *